(12) United States Patent
Sakamoto et al.

(10) Patent No.: US 6,335,414 B1
(45) Date of Patent: Jan. 1, 2002

(54) RTV ORGANOPOLYSILOXANE COMPOSITIONS

(75) Inventors: Takafumi Sakamoto; Mitsuhiro Iwata; Hironao Fujiki, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/522,823

(22) Filed: Mar. 10, 2000

(30) Foreign Application Priority Data

Mar. 12, 1999 (JP) .............................. 11-065840

(51) Int. Cl.$^7$ .................... C08G 77/16; C08G 77/18
(52) U.S. Cl. .................... 528/34; 528/901; 556/482; 556/459; 556/458; 556/427; 556/479; 556/449
(58) Field of Search ................. 528/901, 34; 556/482, 556/459, 458, 427, 479, 449

(56) References Cited

U.S. PATENT DOCUMENTS

| | | | |
|---|---|---|---|
| 3,931,267 A | * | 1/1976 | Brode |
| 4,293,597 A | | 10/1981 | Bessmer et al. |
| 5,190,804 A | * | 3/1993 | Seto et al. |
| 5,247,011 A | * | 9/1993 | Tsuji et al. |
| 5,438,094 A | * | 8/1995 | Fujiki et al. ......................... |

\* cited by examiner

*Primary Examiner*—Robert Dawson
*Assistant Examiner*—Kuo-Liang Peng
(74) *Attorney, Agent, or Firm*—Birch, Stewart, Kolasch & Birch LLP

(57) ABSTRACT

An organopolysiloxane composition comprising (A) an organopolysiloxane, (B) a silane compound having at least two hydrolyzable groups or a partial hydrolyzate thereof, and (C) the addition reaction product between a vinyl group-bearing bisphenol A skeleton compound and an organoxy group-bearing silicon compound is curable at room temperature to a variety of resins including PBT, HIPS and acrylic resins.

6 Claims, 2 Drawing Sheets

RTV ORGANOPOLYSILOXANE COMPOSITIONS

This invention generally relates to organopolysiloxane compositions which cure at room temperature to a variety of resins.

BACKGROUND OF THE INVENTION

Room temperature vulcanizable (RTV) silicone rubbers which have crosslinked in the presence of moisture are easy to handle and have improved weathering and electrical properties. On account of these advantages, they find use in a variety of applications, for example, as sealing materials in building and construction fields and adhesives in electric and electronic fields. In particular, oxime-elimination type RTV silicone rubbers are widely utilized as sealing material in building and construction fields because they are fully weather resistant. For substrates of resins, alcohol-elimination type RTV silicone rubber are utilized because they are compatible with resins.

Similarly for the bonding and securing of electric and electronic parts, a variety of adhesive compositions have been proposed. As the durability of resins improves in these years, there arise many cases where conventional sealing materials fail to provide a bond. There is a desire to have an RTV silicone rubber composition having an improved adhesiveness.

SUMMARY OF THE INVENTION

An object of the invention is to provide an RTV organopolysiloxane composition which cures into a product having improved adhesiveness to a variety of resins and which can be used as building sealants and adhesives for bonding and securing electric and electronic parts.

Attempting to develop an RTV organopolysiloxane composition which is effective as an adhesive sealing material applicable to resins, the inventor has found that an organopolysiloxane composition obtained by blending an organopolysiloxane with a silane compound having at least two hydrolyzable groups each attached to a silicon atom in a molecule or a partial hydrolyzate thereof and the addition reaction product between a vinyl group-bearing bisphenol A skeleton compound and an organoxy or mercapto group-bearing silicon compound cures into a product having drastically improved adhesiveness in that it is bondable to those resins which are believed to be difficult to bond in the prior art, typically polybutylene terephthalate, high impact polystyrene, and acrylic resins. This composition is effectively utilizable as a building sealant and an adhesive for many resins, typically for use in the bonding and securing of electric and electronic parts.

The present invention provides an RTV organopolysiloxane composition comprising (A) 100 parts by weight of an organopolysiloxane of the following general formula (1) or (2), (B) 0.1 to 30 parts by weight of a silane compound having at least two hydrolyzable groups each attached to a silicon atom in a molecule or a partial hydrolyzate thereof, and (C) 0.1 to 10 parts by weight of the addition reaction product between a compound of the following general formula (3) or (4) and a compound of the following general formula (5) or (6).

$$HO(SiR^1_2O)_nH \tag{1}$$

Herein $R^1$ is independently a substituted or unsubstituted monovalent hydrocarbon group of 1 to 10 carbon atoms, and n is an integer of at least 10.

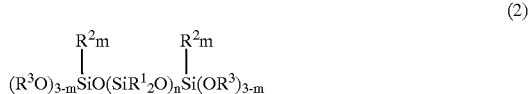
(2)

Herein $R^1$ and n are as defined above, $R^2$ is a substituted or unsubstituted monovalent hydrocarbon group of 1 to 10 carbon atoms, $R^3$ is a monovalent hydrocarbon group of 1 to 6 carbon atoms, and m is equal to 0 or 1.

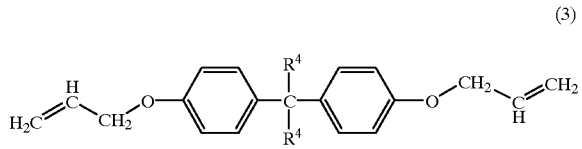
(3)

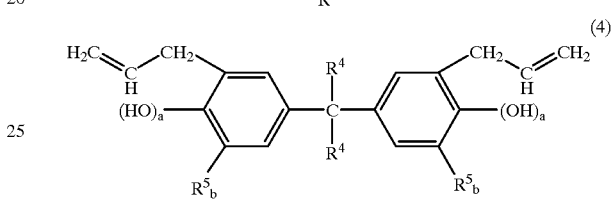
(4)

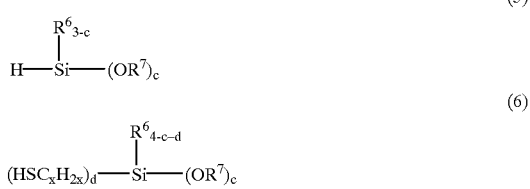
(5)

(6)

Herein $R^4$ and $R^5$ each are hydrogen or methyl, $R^6$ is a substituted or unsubstituted monovalent hydrocarbon group of 1 to 10 carbon atoms, $R^7$ is a substituted or unsubstituted monovalent hydrocarbon group of 1 to 8 carbon atoms, a and b each are equal to 0 or 1, c is equal to 1, 2 or 3, d is equal to 1 or 2, the sum of c+d is equal to 3 or 4, and x is an integer of 1 to 8.

DESCRIPTION OF THE PREFERRED EMBODIMENTS

Figure 1:
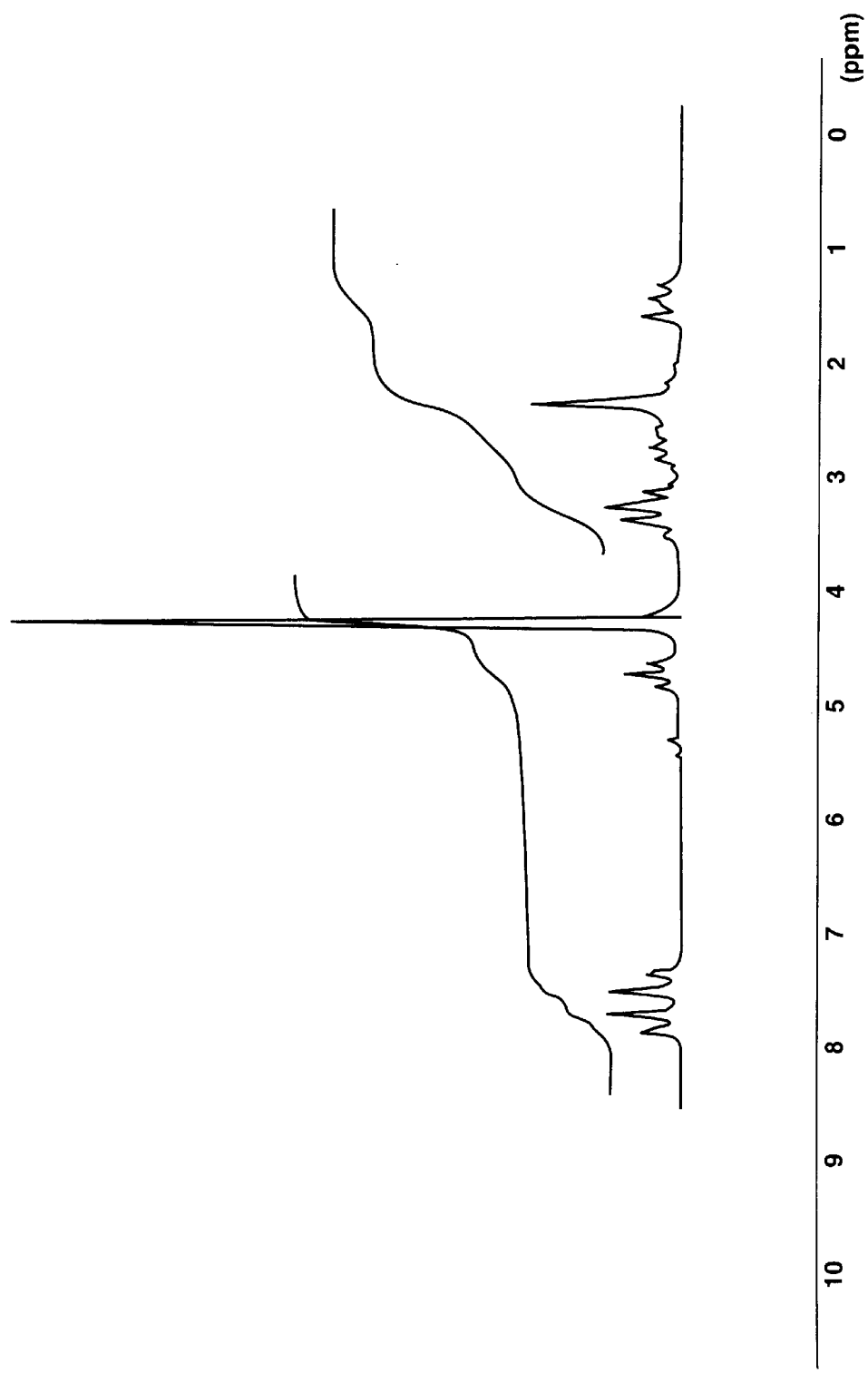
FIG. 1 is a $^1$H-NMR diagram of the reaction product obtained in Synthetic Example 1.

Component (A) of the RTV organopolysiloxane composition according to the invention is an organopolysiloxane of the following general formula (1) or (2).

$$HO(SiR^1_2O)_nH \tag{1}$$

In formula (1), $R^1$ is independently selected from substituted or unsubstituted monovalent hydrocarbon groups of 1 to 10 carbon atoms, for example, alkyl groups such as methyl, ethyl, propyl, butyl, hexyl and octyl; cycloalkyl groups such as cyclohexyl; alkenyl groups such as vinyl, allyl, propenyl, butenyl and hexenyl; aryl groups such as phenyl and tolyl; aralkyl groups such as benzyl and phenylethyl; and substituted ones of these groups in which some of the hydrogen atoms are replaced by halogen atoms (e.g., chlorine, fluorine and bromine), such as trifluoropropyl.

Methyl is most preferred. $R^1$ groups may be identical or different. The letter n is an integer of at least 10 and preferably such an integer that the organopolysiloxane may have a viscosity of about 25 to about 500,000 centistokes (cSt) at 25° C., and especially about 100 to 100,000 cSt at 25° C.

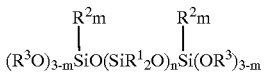  (2)

In formula (2), $R^1$ and n are as defined above. $R^2$ is a substituted or unsubstituted monovalent hydrocarbon group of 1 to 10 carbon atoms, examples of which are as listed above for $R^1$. $R^3$ is a monovalent hydrocarbon group of 1 to 6 carbon atoms, examples of which are as listed above for $R^1$, preferably an unsubstituted one, and more preferably a $C_1-C_4$ alkyl group such as methyl. The letter m is equal to 0 or 1.

Component (B) is a silane compound having at least two hydrolyzable groups, such as ketoxime, alkoxy or alkenoxy groups, each attached to a silicon atom in a molecule or a partial hydrolyzate thereof.

The preferred silane compounds used herein are ketoximesilanes and alkoxysilanes. Most preferred are silane compounds having ketoxime groups represented by the following general formula (7):

  (7)

wherein $R^8$ is independently a substituted or unsubstituted monovalent hydrocarbon group of 1 to 10 carbon atoms, $R^9$ is an unsubstituted monovalent hydrocarbon group of 1 to 10 carbon atoms, and e is equal to 0. 1 or 2.

Examples of the group represented by $R^8$ are as listed above for $R^1$. $R^8$ groups may be identical or different. Examples of the group represented by $R^9$ are unsubstituted ones among those listed above for $R^1$.

Illustrative examples of the hydrolyzable silane compound (B) include methyltris(dimethylketoxime)silane, methyltris(methylethylketoxime)silane, ethyltris(methylethylketoxime)silane, methyltris(methylisobutylketoxime)silane, vinyltris(methylethylketoxime)silane, vinyltris(dimethylketoxime)silane, phenyltris(methylethylketoxime)-silane, and phenyltris(dimethylketoxime)silane, which fall in the ketoximesilanes of formula (7). Other exemplary silanes are methyltrimethoxysilane, methyltriacetoxysilane, methyltriisopropenoxysilane, vinyltrimethoxysilane, vinyltri(2-methoxyethoxy)silane, and vinyltriacetoxysilane. These silanes may be used alone or in admixture of two or more.

The silane compound or a partial hydrolyzate thereof is used in an amount of 0.1 to 30 parts, and preferably 1 to 15 parts by weight per 100 parts by weight of the organopolysiloxane (A). Less amounts of the silane compound fail to achieve sufficient crossliking and to form a rubber with the desired elasticity. Excessive amounts of the silane compound lead to poor mechanical properties.

Component (C) is the addition reaction product between a compound of the following general formula (3) or (4) and a compound of the following general formula (5) or (6). This component is most essential for imparting a resin-bonding ability to the composition.

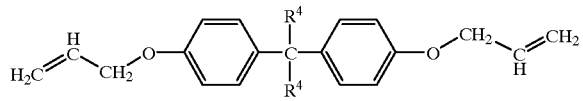  (3)

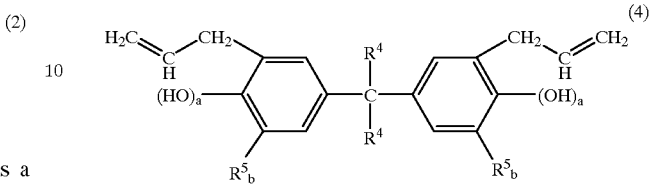  (4)

  (5)

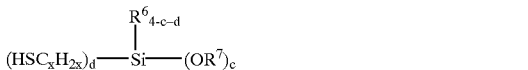  (6)

Herein $R^4$ and $R^5$ each are hydrogen or methyl, $R^6$ is a substituted or unsubstituted monovalent hydrocarbon group of 1 to 10 carbon atoms, and $R^7$ is a substituted or unsubstituted monovalent hydrocarbon group of 1 to 8 carbon atoms. Examples of the groups represented by $R^6$ and $R^7$ are the same as listed above for $R^1$. The substituted monovalent hydrocarbon groups represented by $R^7$ may be alkoxy-substituted ones. Especially $R^7$ stands for alkyl groups or alkoxy-substituted alkyl groups.

Letters a and b each are equal to 0 or 1, c is equal to 1, 2 or 3, d is equal to 1 or 2, the sum of c+d is equal to 3 or 4, and x is an integer of 1 to 8.

The addition reaction between the compound of formula (3) or (4) and the compound of formula (5) or (6) can be effected under suitable conditions well known for addition reaction or hydrosilylation. Through the addition reaction, the hydrogen atom attached to silicon (hydrogen atom of SiH group) in formula (5) or the hydrogen atom of mercapto group in formula (6) adds to a vinyl group ($CH_2=CH-$) at either end of the compound of formula (3) or (4). There is obtained an addition reaction product in which the compound of formula (3) or (4) and the compound of formula (5) or (6) are coupled through a linkage:

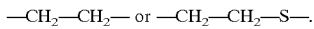

Illustrative examples of the addition reaction product are given below.

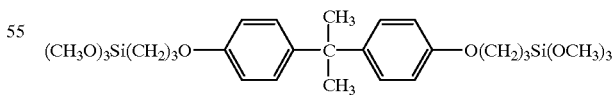

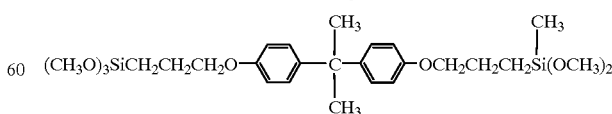

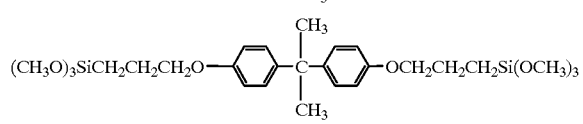

-continued

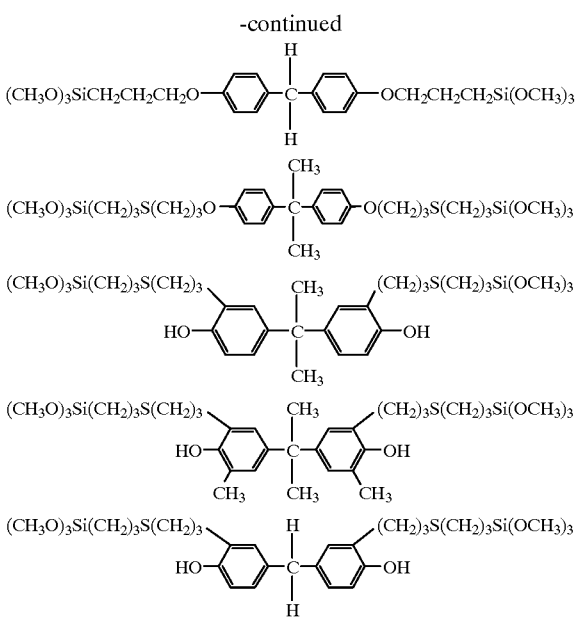

An appropriate amount of component (C) blended is 0.1 to 10 parts, preferably 0.2 to 5 parts by weight per 100 parts by weight of the organopolysiloxane (A). An amount below the limit of component (C) fails to achieve a satisfactory adhesiveness.

In addition to the above-described components, the organopolysiloxane composition of the invention may further contain optional components, for example, well-known fillers, additives and catalysts, insofar as the benefits of the invention are not impaired. Exemplary fillers include ground silica, fumed silica, calcium carbonate, zinc carbonate, and wet silica. Exemplary additives include thixotropy modifiers such as polyethers, mildew-resistant agents, antibacterial agents, and dimethylsilicone fluid blocked with a trimethylsilyl group at each end, and adhesive aids, e.g., aminosilanes such as γ-aminopropyltriethoxysilane and 3-(2-aminoethyl)aminopropyltrimethoxysilane and epoxysilanes such as γ-glycidylpropyltrimethoxysilane and β-(3,4-epoxycyclohexyl)ethyltrimethoxysilane. Exemplary catalysts include organic tin catalysts such as organic tin esters and organic tin chelates, and organic titanium catalysts such as alkoxytitanium, organic titanates, and organic titanium chelates. An appropriate amount of the catalyst added is 0.01 to 10 parts by weight per 100 parts by weight of the organopolysiloxane (A). These optional components may be added in ordinary amounts insofar as the benefits of the invention are not impaired.

The RTV organopolysiloxane composition can be prepared by mixing the essential and optional components in a conventional manner. On use as an adhesive, the resulting composition can be applied to a variety of substrates. The substrates to which the inventive composition is applicable include a number of resins, typically polybutylene terephthalate (PBT), high-impact polystyrene (HIPS), and acrylic resins. Although in the past, PBT, HIPS and acrylic resins are believed to be difficult to bond, the inventive composition is firmly bondable to those difficult-to-bond resins. The inventive composition can be advantageously used in the application where substrates are made of these resins.

The inventive composition is curable under conditions as used for well-known RTV organopolysiloxane compositions of this type.

EXAMPLE

Examples of the invention are given below by way of illustration and not by way of limitation. All parts are by weight.

Synthetic Example 1

A three-necked round flask equipped with a thermometer, magnetic stirrer, reflux condenser and nitrogen inlet tube was purged with nitrogen and charged with 1 mol of an allyl ether compound of the following formula (8), 2 mol of γ-mercaptopropyltrimethoxysilane, and 0.5 g of 2,2'-azobis (2-methylbutyronitrile) whereupon the mixture was heated to 80° C. to effect reaction. The progress of reaction was tracked by gas chromatography (GC) analysis. After the disappearance of the peak attributable to γ-mercaptopropyltrimethoxysilane was confirmed, the reaction mixture was heat ripened for 5 hours. Thereafter, the impurities were removed at 160° C. and 20 mmHg, leaving an Addition Reaction Product 1 represented by the following formula (9). For structural determination, the reaction product was analyzed by $^1$H-NMR, obtaining a spectral diagram shown in FIG. 1.

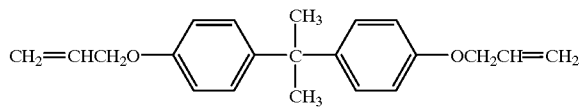

(8)

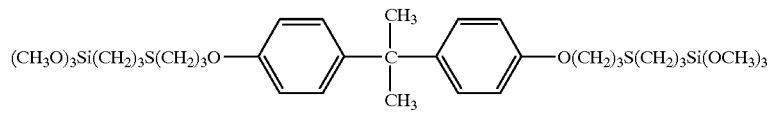

(9)

Reaction Product 1

Synthetic Example 2

Figure 2:
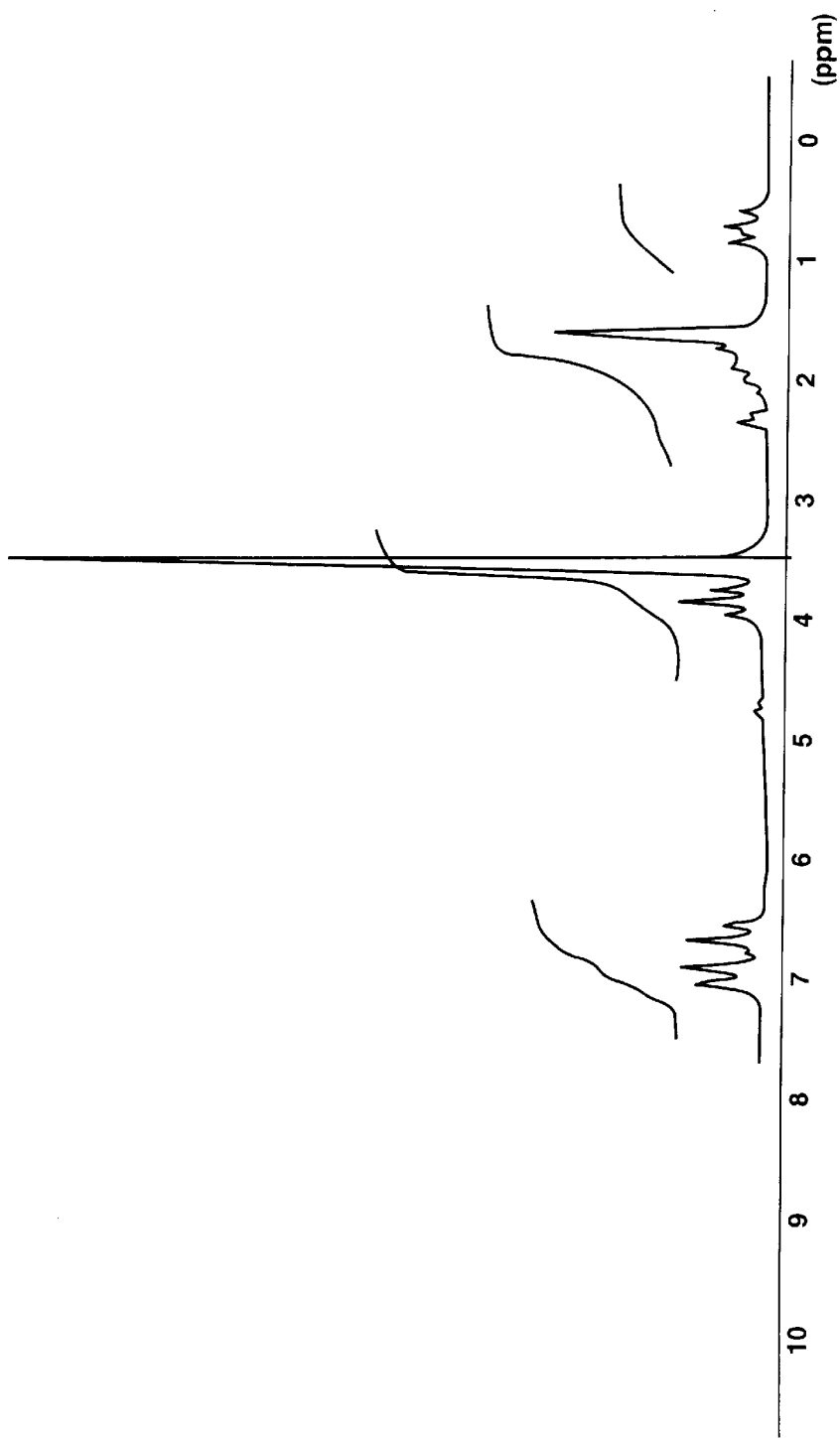
FIG. 2 is a $^1$H-NMR diagram of the reaction product obtained in Synthetic Example 2.

A three-necked round flask equipped with a thermometer, magnetic stirrer, reflux condenser and nitrogen inlet tube was purged with nitrogen and charged with 1 mol of an allyl ether compound of the following formula (10), 2 mol of trimethoxysilane, and 0.5 g of 2,2'-azobis(2-methylbutyronitrile) whereupon the mixture was heated to 80° C. to effect reaction. The progress of reaction was tracked by GC analysis. After the disappearance of the peak attributable to trimethoxysilane was confirmed, the reaction mixture was heat ripened for 5 hours. Thereafter, the impurities were removed at 160° C. and 20 mmHg, leaving an Addition Reaction Product 2 represented by the following formula (11). For structural determination, the reaction product was analyzed by $^1$H-NMR, obtaining a spectral diagram shown in FIG. 2.

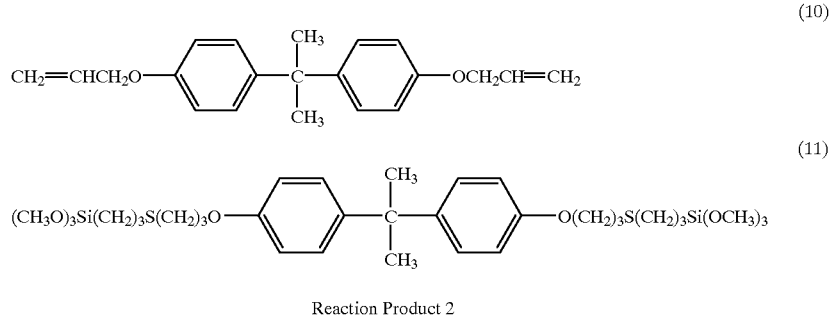

Reaction Product 2

Example 1

In a mixer, 70 parts of a polydimethylsiloxane I end-blocked with a trimethoxysilyl group and having a viscosity of 20,000 cSt at 25° C. and 10 parts of fumed silica surface treated with dimethyldichlorosilane were mixed, to which 2 parts of methyltrimethoxysilane and 0.5 part of tetrabutoxytitanium were added. The ingredients were thoroughly mixed in vacuum. Further, 2.0 parts of Addition Reaction Product 1 obtained in Synthetic Example 1 was added to the mixture, which was thoroughly mixed in vacuum, yielding Sample No. 1.

Example 2

In a mixer, 70 parts of a polydimethylsiloxane II end-blocked with a silanol group and having a viscosity of 20,000 cSt at 25° C. and 10 parts of fumed silica surface treated with dimethyldichlorosilane were mixed, to which 6 parts of methyltributanoximesilane and 0.1 part of dibutyltin dioctate were added. The ingredients were thoroughly mixed in vacuum. Further, 2.0 parts of Addition Reaction Product 1 obtained in Synthetic Example 1 was added to the mixture, which was thoroughly mixed in vacuum, yielding Sample No. 2.

Example 3

Sample No. 3 was prepared by the same procedure as in Example 1 except that 2.0 parts of Addition Reaction Product 2 obtained in Synthetic Example 2 was used instead of the Reaction Product 1.

Example 4

Sample No. 4 was prepared by the same procedure as in Example 2 except that 6 parts of vinyltriisopropenoxysilane and 0.5 part of tetramethylguanidylpropyltrimethoxysilane were used instead of the methyltributanoximesilane and the dibutyltin dioctate, respectively.

Comparative Example 1

Sample No. 5 was prepared by the same procedure as in Example 1 except that 2.0 parts of 3-(2-aminoethyl)aminopropyltrimethoxysilane was used instead of the Reaction Product 1.

Comparative Example 2

Sample No. 6 was prepared by the same procedure as in Example 2 except that 2.0 parts of 3-(2-aminoethyl)aminopropyltrimethoxysilane was used instead of the Reaction Product 1.

Comparative Example 3

Sample No. 7 was prepared by the same procedure as in Example 3 except that 2.0 parts of y-aminopropyltriethoxysilane was used instead of the Reaction Product 2.

Comparative Example 4

Sample No. 8 was prepared by the same procedure as in Example 4 except that 2.0 parts of 3-(2-aminoethyl)aminopropyltrimethoxysilane was used instead of the Reaction Product 1.

Comparative Examples 5–7

By following the same procedure as in Example 1, Sample Nos. 9 to 11 were prepared according to the composition shown in Table 3.

The samples obtained in the foregoing Examples and Comparative Examples were examined for physical properties and adhesion by the following tests. The test results of the respective samples are shown in Tables 1 to 6 together with their composition (expressed in parts by weight).

Hardness, elongation at break, tensile strength:

The sample was molded into a sheet of 2 mm thick, which was cured for one week in an atmosphere of 23±2° C. and RH 50±5%. The physical properties (including hardness, elongation at break, and tensile strength) of this sheet were measured according to JIS K 6249. The hardness is a measurement of Durometer A. These properties are initial physical properties.

The uncured sample as packed in a cartridge wag heat aged in a dryer at 70° C. and similarly measured for the physical properties. These properties are aged physical properties.

Adhesion:

Test pieces were prepared by applying the sample to three types of substrates over a coating area of 25×10 mm and to a coating thickness of 2 mm. Each test piece was pulled in a shearing direction to measure a bond force. This is an initial bond force.

The uncured sample as packed in a cartridge was heat aged in a dryer at 70° C. and then applied to substrates to form test pieces, which were similarly measured for a bond force. This measurement is an aged bond force.

Substrates:

polybutylene terephthalate (PBT)
high-impact polystyrene (HIPS)
acrylic resin

TABLE 1

| Component (parts by weight) | Example 1 | Example 2 | Example 3 | Example 4 |
|---|---|---|---|---|
| Polydimethylsiloxane I | 70 | — | 70 | — |
| Polydimethylsiloxane II | — | 70 | — | 70 |
| Fumed silica | 10 | 10 | 10 | 10 |
| Methyltrimethoxysilane | 2 | — | 2 | 2 |
| Methyltributanoximesilane | — | 6 | — | — |
| Methyltriisopropenoxysilane | — | — | — | 6 |
| Tetrabutoxytitanium | 0.5 | — | 0.5 | — |
| Dibutyltin dioctate | — | 0.1 | — | — |
| Tetramethylguanidylpropyltrimethoxysilane | — | — | — | 0.5 |
| Addition Reaction Product 1 | 2 | 2 | — | 2 |
| Addition Reaction Product 2 | — | — | 2 | — |
| 3-(2-aminoethyl)aminopropyltrimethoxysilane | — | — | — | — |
| γ-aminopropyltriethoxysilane | — | — | — | — |

TABLE 2

| Component (parts by weight) | Comparative Example 1 | Comparative Example 2 | Comparative Example 3 | Comparative Example 4 |
|---|---|---|---|---|
| Polydimethylsiloxane I | 70 | — | 70 | — |
| Polydimethylsiloxane II | — | 70 | — | 70 |
| Fumed silica | 10 | 10 | 10 | 10 |
| Methyltrimethoxysilane | 2 | — | 2 | — |
| Methyltributanoximesilane | — | 6 | — | — |
| Methyltriisopropenoxysilane | — | — | — | 6 |
| Tetrabutoxytitanium | 0.5 | — | 0.5 | — |
| Dibutyltin dioctate | — | 0.1 | — | — |
| Tetramethylguanidylpropyltrimethoxysilane | — | — | — | 0.5 |
| Addition Reaction Product 1 | — | — | — | — |
| Addition Reaction Product 2 | — | — | — | — |
| 3-(2-aminoethyl)aminopropyltrimethoxysilane | 2 | 2 | — | 2 |
| γ-aminopropyltriethoxysilane | — | — | 2 | — |

TABLE 3

| Component (parts by weight) | Comparative Example 5 | Comparative Example 6 | Comparative Example 7 |
|---|---|---|---|
| Polydimethylsiloxane I | 70 | 70 | 70 |
| Fumed silica | 10 | 10 | 10 |
| Methyltrimethoxysilane | 2 | 2 | 2 |
| Tetrabutoxytitanium | 0.5 | 0.5 | 0.5 |
| Guanidylpropyltrimethoxysilane | 2 | — | — |
| Mercaptopropyltrimethoxysilane | — | 1 | — |
| Trimethoxysilane | — | — | 1 |
| Aryl ether of formula (10) | — | 1 | 1 |

TABLE 4

| | | Example 1 | Example 2 | Example 3 | Example 4 |
|---|---|---|---|---|---|
| Initial physical properties | Hardness (Durometer A) | 28 | 32 | 31 | 30 |
| | Elongation at break (%) | 350 | 320 | 300 | 320 |
| | Tensile strength (MPa) | 1.6 | 1.8 | 1.7 | 1.7 |
| Initial adhesion | to PBT (MPa) | 0.8 | 0.9 | 0.7 | 0.8 |
| | to HIPS (MPa) | 0.7 | 0.8 | 0.7 | 0.8 |
| | to acrylic resin (MPa) | 0.9 | 0.9 | 0.8 | 0.8 |
| Aged physical properties | Hardness (Durometer A) | 29 | 31 | 32 | 31 |
| | Elongation at break (%) | 320 | 350 | 320 | 290 |
| | Tensile strength (MPa) | 1.5 | 1.9 | 1.6 | 1.8 |
| Aged adhesion | to PBT (MPa) | 0.8 | 0.9 | 0.7 | 0.7 |
| | to HIPS (MPa) | 0.8 | 0.9 | 0.8 | 0.7 |
| | to acrylic resin (MPa) | 0.7 | 0.8 | 0.8 | 0.9 |

TABLE 5

| | | Comparative Example 1 | Comparative Example 2 | Comparative Example 3 | Comparative Example 4 |
|---|---|---|---|---|---|
| Initial physical properties | Hardness (Durometer A) | 30 | 33 | 28 | 31 |
| | Elongation at break (%) | 330 | 340 | 280 | 320 |
| | Tensile strength (MPa) | 1.7 | 1.8 | 1.7 | 1.8 |
| Initial adhesion | to PBT (MPa) | 0.1 | 0.2 | peeled | peeled |
| | to HIPS (MPa) | peeled | peeled | peeled | peeled |
| | to acrylic resin (MPa) | peeled | peeled | peeled | peeled |
| Aged physical properties | Hardness (Durometer A) | 26 | 32 | 26 | 29 |
| | Elongation at break (%) | 280 | 330 | 290 | 310 |
| | Tensile strength (MPa) | 1.4 | 1.7 | 1.5 | 1.7 |
| Aged adhesion | to PBT (MPa) | peeled | peeled | peeled | peeled |
| | to HIPS (MPa) | peeled | peeled | peeled | peeled |
| | to acrylic resin (MPa) | peeled | peeled | peeled | peeled |

TABLE 6

| | | Comparative Example 5 | Comparative Example 6 | Comparative Example 7 |
|---|---|---|---|---|
| Initial physical properties | Hardness (Durometer A) | 32 | 30 | 31 |
| | Elongation at break (%) | 300 | 310 | 310 |
| | Tensile strength (MPa) | 1.8 | 1.7 | 1.8 |
| Initial adhesion | to PBT (MPa) | 0.3 | peeled | peeled |
| | to HIPS (MPa) | peeled | peeled | peeled |
| | to acrylic resin (MPa) | peeled | peeled | peeled |
| Aged physical properties | Hardness (Durometer A) | 30 | 29 | 28 |
| | Elongation at break (%) | 310 | 280 | 300 |
| | Tensile strength (MPa) | 1.8 | 1.5 | 1.6 |
| Aged adhesion | to PBT (MPa) | peeled | peeled | peeled |
| | to HIPS (MPa) | peeled | peeled | peeled |
| | to acrylic resin (MPa) | peeled | peeled | peeled |

There has been described an RTV organopolysiloxane composition which cures into a silicone rubber having drastically improved adhesiveness to a variety of resins, especially PBT, HIPS, and acrylic resins which are heretofore believed to be difficult to bond. This composition is effectively utilizable as sealants for plumbing fixtures, building sealants, and adhesives for use in bonding and securing electric and electronic parts.

Japanese Patent Application No. 11-065840 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An RTV organopolysiloxane composition comprising
   (A) 100 parts by weight of an organopolysiloxane of the following general formula (1) or (2):

$$HO(SiR^1_2O)_nH \qquad (1)$$

wherein $R^1$ is independently a substituted or unsubstituted monovalent hydrocarbon group of 1 to 10 carbon atoms, and n is an integer of at least 10, or

  (2)

wherein $R^1$ and n are as defined above, $R^2$ is a substituted or unsubstituted monovalent hydrocarbon group of 1 to 10 carbon atoms, $R^3$ is a monovalent hydrocarbon group of 1 to 6 carbon atoms, and m is equal to 0 or 1, (B) 0.1 to 30 parts by weight of a silane compound having at least two hydrolyzable groups each attached to a silicon atom in a molecule or a partial hydrolyzate thereof, and (C) 0.1 to 10 parts by weight of the addition reaction product between a compound of the following general formula (3) and a compound of the following general formula (5) or (6) or the addition reaction product between a compound of the following general formula (4) and a compound of the following general formula (6):

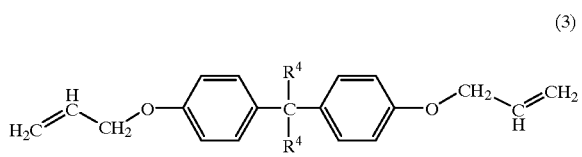 (3)

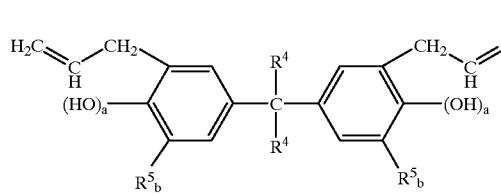 (4)

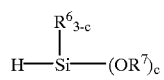 (5)

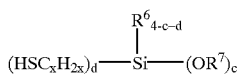 (6)

wherein $R^4$ and $R^5$ each are hydrogen or methyl, $R^6$ is a substituted or unsubstituted monovalent hydrocarbon group of 1 to 10 carbon atoms, $R^7$ is a substituted or unsubstituted monovalent hydrocarbon group of 1 to 8 carbon atoms, a and b each are equal to 0 or 1, c is equal to 1, 2 or 3, d is equal to 1 or 2, the sum of c+d is equal to 3 or 4, and x is an integer of 1 to 8.

2. The composition of claim 1, wherein component (A) has a viscosity of about 100 to 100,000 centistokes at 25° C.

3. The composition of claim 1, wherein the silane compound of component (B) is an alkoxysilane or ketoximesilane.

4. The composition of claim 3, where component (B) is a silane compound of the following general formula (7):

 (7)

wherein $R^8$ is independently a substituted or unsubstituted monovalent hydrocarbon group of 1 to 10 carbon atoms, $R^9$ is an unsubstituted monovalent hydrocarbon group of 1 to 10 carbon atoms, and e is equal to 0, 1 or 2.

5. The composition of claim 1, into which component (C) is blended in an amount of from 0.2 to 5 parts by weight per 100 parts by weight of component (A).

6. The composition of claim 1, wherein component (C) is a compound of the formula

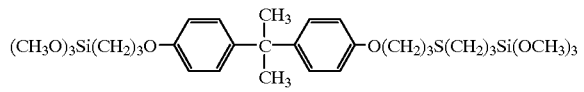

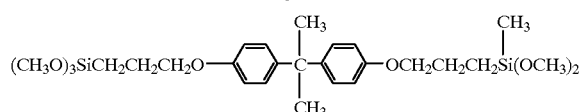

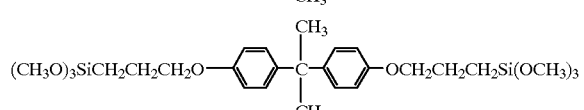

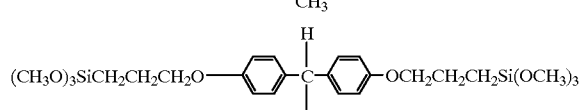

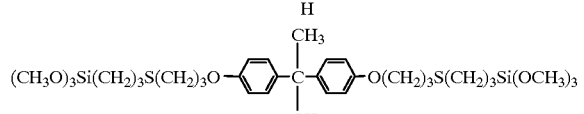

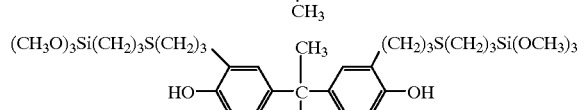

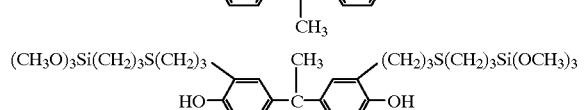

or

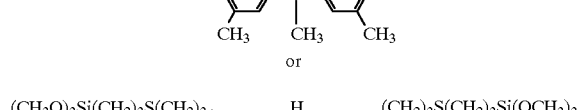

* * * * *